United States Patent
Shoemaker Ellis et al.

(10) Patent No.: US 10,690,798 B2
(45) Date of Patent: *Jun. 23, 2020

(54) GIANT DIELECTRIC NANOPARTICLES AS HIGH CONTRAST AGENTS FOR ELECTROMAGNETIC (EM) FLUIDS IMAGING IN AN OIL RESERVOIR

(71) Applicant: Saudi Arabian Oil Company, Dhahran (SA)

(72) Inventors: Erika Shoemaker Ellis, Dhahran (SA); Howard Khan Schmidt, Dhahran (SA); Jesus Manuel Felix Servin, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 16/388,170

(22) Filed: Apr. 18, 2019

(65) Prior Publication Data

US 2019/0250300 A1    Aug. 15, 2019

Related U.S. Application Data

(63) Continuation of application No. 15/805,844, filed on Nov. 7, 2017, now Pat. No. 10,365,393.

(51) Int. Cl.
*G01V 3/26* (2006.01)
*G01V 3/30* (2006.01)

(52) U.S. Cl.
CPC . *G01V 3/26* (2013.01); *G01V 3/30* (2013.01)

(58) Field of Classification Search
CPC ................................. G01V 3/30; G01V 3/26
See application file for complete search history.

(56) References Cited

U.S. PATENT DOCUMENTS 3,146,351 A    8/1964    Hover et al.
3,238,477 A    3/1966    Brueckmann
(Continued)

FOREIGN PATENT DOCUMENTS

CN    102147484 A    8/2011
EP    2610433 A1    7/2013
(Continued)

OTHER PUBLICATIONS

P. Thomas, Nanoparticles of the giant dielectric material, CaCu3Ti4O12 from a precursor route (Year: 2008).*
(Continued)

*Primary Examiner* — Alvaro E Fortich
(74) *Attorney, Agent, or Firm* — Bracewell LLP; Constance G. Rhebergen; Brian H. Tompkins (57) ABSTRACT

Provide are compositions and methods for electromagnetic (EM) surveying of subsurface hydrocarbon reservoirs using a giant dielectric material as a contrast agent. An injection fluid composition for EM surveying may include an aqueous fluid and giant dielectric nanoparticles having a dielectric constant of at least 10000 in the 1 Hz to 1 MHz frequency range. EM surveying of a subsurface hydrocarbon reservoirs may be performed by introducing an injection fluid having the giant dielectric nanoparticles into the subsurface hydrocarbon reservoir and generating an image of the position of the injection fluid from a transit time of emitted EM energy that traveled through the reservoir.

6 Claims, 3 Drawing Sheets

(56) References Cited

U.S. PATENT DOCUMENTS

| | | | |
|---|---|---|---|
| 4,062,010 | A | 12/1977 | Young et al. |
| 4,109,522 | A | 8/1978 | Thompson |
| 4,246,586 | A | 1/1981 | Henderson et al. |
| 4,430,653 | A | 2/1984 | Coon et al. |
| 4,498,086 | A | 2/1985 | Sandler |
| 4,661,700 | A | 4/1987 | Holenka |
| 4,755,944 | A | 7/1988 | Glass |
| 4,785,247 | A | 11/1988 | Meador et al. |
| 4,876,450 | A | 10/1989 | Montgomery |
| 5,041,922 | A | 8/1991 | Wood et al. |
| 5,081,611 | A | 1/1992 | Hornby |
| 5,192,952 | A | 3/1993 | Johler |
| 5,280,284 | A | 1/1994 | Johler |
| 5,302,895 | A | 4/1994 | Philpot |
| 5,323,114 | A | 6/1994 | Nagamune et al. |
| 5,373,443 | A | 12/1994 | Lee et al. |
| 5,408,182 | A | 4/1995 | Stolarczyk et al. |
| 5,588,032 | A | 12/1996 | Johnson et al. |
| 6,043,947 | A | 3/2000 | Gooch et al. |
| 6,061,300 | A | 5/2000 | Yamamoto |
| 6,061,633 | A | 5/2000 | Fukuhara et al. |
| 6,084,412 | A | 7/2000 | Guo et al. |
| 6,483,310 | B1 | 11/2002 | Meador |
| 6,489,772 | B1 | 12/2002 | Holladay et al. |
| 6,651,739 | B2 | 11/2003 | Arndt et al. |
| 6,753,814 | B2 | 6/2004 | Killen et al. |
| 7,424,911 | B2 | 9/2008 | McCarthy et al. |
| 7,450,053 | B2 | 11/2008 | Funk et al. |
| 7,477,162 | B2 | 1/2009 | Clark |
| 7,598,898 | B1 | 10/2009 | Funk et al. |
| 8,030,934 | B2 | 10/2011 | Barsukov et al. |
| 8,354,939 | B2 | 1/2013 | McDaniel et al. |
| 8,638,104 | B2 | 1/2014 | Barber et al. |
| 8,664,586 | B2 | 3/2014 | Schmidt |
| 8,664,587 | B2 | 3/2014 | Evans et al. |
| 8,803,077 | B2 | 8/2014 | Schmidt |
| 8,810,247 | B2 | 8/2014 | Kuckes |
| 8,917,094 | B2 | 12/2014 | Bittar et al. |
| 8,937,279 | B2 | 1/2015 | Schmidt |
| 8,957,683 | B2 | 2/2015 | Bittar et al. |
| 9,206,645 | B2 | 12/2015 | Hallundbaek |
| 9,490,518 | B1 | 11/2016 | Herbsommer et al. |
| 9,520,649 | B2 | 12/2016 | De Rochemont |
| 9,568,635 | B2 | 2/2017 | Suhami |
| 9,689,253 | B2 | 6/2017 | Rivero et al. |
| 2005/0030036 | A1 | 2/2005 | Hunziker et al. |
| 2006/0151863 | A1 | 7/2006 | Das et al. |
| 2006/0203613 | A1 | 9/2006 | Thomsen et al. |
| 2007/0209799 | A1 | 9/2007 | Vinegar et al. |
| 2007/0294036 | A1 | 12/2007 | Strack et al. |
| 2008/0036452 | A1 | 2/2008 | Hirayama |
| 2009/0133870 | A1 | 5/2009 | Pavlov et al. |
| 2009/0150077 | A1 | 6/2009 | Stoller et al. |
| 2009/0179646 | A1 | 7/2009 | Fath et al. |
| 2009/0179649 | A1 | 7/2009 | Schmidt et al. |
| 2009/0204330 | A1 | 8/2009 | Thomsen et al. |
| 2009/0205899 | A1 | 8/2009 | Geerits et al. |
| 2009/0224610 | A1 | 9/2009 | Fuks et al. |
| 2009/0240436 | A1 | 12/2009 | Heigl |
| 2010/0060381 | A1 | 3/2010 | Das et al. |
| 2010/0085041 | A1 | 4/2010 | Pozidis et al. |
| 2010/0155128 | A1 | 6/2010 | Tombs |
| 2010/0155138 | A1 | 6/2010 | Kuckes |
| 2010/0171426 | A1 | 7/2010 | Kloss et al. |
| 2011/0108283 | A1 | 5/2011 | Srnka et al. |
| 2011/0198078 | A1 | 8/2011 | Harrigan et al. |
| 2011/0227577 | A1 | 9/2011 | Zhang et al. |
| 2011/0255371 | A1 | 10/2011 | Jing et al. |
| 2012/0120767 | A1 | 5/2012 | Vu et al. |
| 2012/0201096 | A1 | 8/2012 | Valero et al. |
| 2013/0006535 | A1 | 1/2013 | Zhang et al. |
| 2013/0066587 | A1 | 3/2013 | Kalathil et al. |
| 2013/0088364 | A1 | 4/2013 | Bittar et al. |
| 2013/0146756 | A1 | 6/2013 | Schmidt |
| 2013/0249705 | A1 | 9/2013 | Sharp et al. |
| 2013/0285781 | A1* | 10/2013 | Yin .................. H01B 3/22 336/58 |
| 2013/0319685 | A1 | 12/2013 | Pike |
| 2014/0060804 | A1 | 3/2014 | Barbour et al. |
| 2014/0183694 | A1 | 7/2014 | Gardner et al. |
| 2014/0275956 | A1 | 9/2014 | Fan |
| 2014/0347055 | A1* | 11/2014 | Schmidt .................. G01V 3/12 324/338 |
| 2014/0374091 | A1* | 12/2014 | Wilt .................. E21B 49/00 166/254.1 |
| 2015/0015264 | A1 | 1/2015 | Dorovsky |
| 2015/0083404 | A1* | 3/2015 | Wilt .................. E21B 47/0905 166/250.1 |
| 2015/0097561 | A1 | 4/2015 | Desmulliez et al. |
| 2015/0167459 | A1* | 6/2015 | Sen .................. G01V 3/30 166/254.1 |
| 2015/0295651 | A1 | 10/2015 | Herbsommer et al. |
| 2015/0357121 | A1 | 12/2015 | Andrakin |
| 2016/0040514 | A1 | 2/2016 | Rahmani et al. |
| 2016/0299092 | A1 | 10/2016 | Dorovsky |
| 2016/0327677 | A1 | 11/2016 | Fouda et al. |
| 2017/0012361 | A1 | 1/2017 | Prammer |

FOREIGN PATENT DOCUMENTS

| | | |
|---|---|---|
| EP | 2884309 A2 | 6/2015 |
| WO | 2008033225 A2 | 3/2008 |
| WO | 2016018377 A1 | 2/2016 |
| WO | 2016089387 A1 | 6/2016 |

OTHER PUBLICATIONS

M. A. Subramanian, High Dielectric Constant in ACu3Ti4O12 and ACu3Ti3FeO12 Phases (Year: 2000).*

Al Ali, Malaita et al.; "Constraining Interwell Water Flood Imaging with Geology and Petrophysics: An Example from the Middle East" SPE 120558; SPE Middle East Oil & Gas Show, Bahrain, Mar. 15-18, 2009; 11 pgs.

Al-Shehri, et al., "Illuminating the Reservoir: Magnetic NanoMappers" SPE 164461, SPE Middle East Oil and Gas Show and Exhibition, Bahrain, Mar. 10-13, 2013; pp. 1-10.

Gao, B. et al.,"Ferrite Film Loaded Frequency Selective Metamaterials for Sub-GHz Applications", pp. 1-9, Materials 2016, 9(12), 1009.

Gong, B. et al; "Approach Trims Size of Dipole Antenna", Apr. 23, 2014.

Hwang, Y. et al., "Planar inverted F antenna loaded with high permittivity material", Electronics Letters, Sep. 28, 1995, pp. 1710-1712, vol. 31, Issue: 20, Shatin, NT, Hong Kong.

International Search Report and Written Opinion for International Application No. PCT/US2012/068367 (SA795/PCT), dated Aug. 20, 2013; pp. 1-9.

International Search Report and Written Opinion for International Application No. PCT/US2018/022294 (SA5329PCT), dated Jul. 6, 2018; pp. 1-16.

International Search Report and Written Opinion for International Application No. PCT/US2018/059585 (SA5754) dated Mar. 4, 2019; pp. 1-15.

International Search Report and Written Opinion for International Application No. PCT/US2018/062177 (SA5753) dated Mar. 4, 2019; pp. 1-17.

James, J.R. et al., "Electrically short monopole antennas with dielectric or ferrite coatings", Proceedings of the Institution of Electrical Engineers, vol. 125, Issue: 9; Sep. 1978, pp. 793-803.

Nekut, A.G.; "Electromagnetic ray-trace tomography" Geophysics, vol. 59, No. 3 (Mar. 1994); p. 371-377, 7 Figs.

Petrov, R.V., et al., "Antenna miniaturization with ferrite ferroelectric composites", Microwave and Optical Technology Letters, vol. 50, Issue 12, pp. 3154-3157, Dec. 2008.

Saenz, et al., "Resonant Meta-Surface Superstrate for Single and Multifrequency Dipole Antenna Arrays", IEEE Transactions on Antennas and Propagation, vol. 56 No. 4, pp. 951-960.

(56) References Cited

OTHER PUBLICATIONS

Subramanian et al., "High Dielectric Constant in ACu3Ti4O12 and ACu3Ti3FeO12 Phases", Journal of Solid State Chemistry, 2000, pp. 323-325, vol. 151, No. 2, Academic Press.
Thomas et al., "Nanoparticles of the giant dielectric material, CaCu3Ti4O12 from a precursor route", Journal of Physics and Chemistry of Solids, 2008, pp. 1-47.
Wilt, Mike; "Oil Reservoir Characterization and CO2 Injection Monitoring in the Permian Basin with Crosswell Electromagnetic Imaging" DOE Award No. DE-FC26-00BC15307, Mar. 2002; 59 pgs.
International Search Report and Written Opinion for International Application No. PCT/US2019/013994 dated Apr. 29, 2019. (SA5758).

\* cited by examiner

GIANT DIELECTRIC NANOPARTICLES AS HIGH CONTRAST AGENTS FOR ELECTROMAGNETIC (EM) FLUIDS IMAGING IN AN OIL RESERVOIR

CROSS-REFERENCE TO RELATED APPLICATIONS

This application is a continuation of and claims priority from U.S. Non-provisional application Ser. No. 15/805,844 filed Nov. 7, 2017, and titled "GIANT DIELECTRIC NANOPARTICLES AS HIGH CONTRAST AGENTS FOR ELECTROMAGNETIC (EM) FLUIDS IMAGING IN AN OIL RESERVOIR," A copy of which is incorporated by reference in its entirety for purposes of United States patent practice.

BACKGROUND

Field of the Disclosure

The present disclosure generally relates to imaging subsurface structures such as hydrocarbon reservoirs and fluids located in such reservoirs. More specifically, embodiments of the disclosure relate to cross-well and borehole-to-surface electromagnetic (EM) surveying of such reservoirs and fluids.

Description of the Related Art

Cross-well and borehole-to-surface electromagnetic (EM) surveying for hydrocarbon reservoirs typically uses continuous-wave (CW) EM sources placed in one borehole and receivers (such as sensors) that detect the phase and amplitude of the EM signal in a distal borehole, using multiple source and receiver positions. The detected data and inferred transit times may be used with the source and receiver geometry to create a 2D conductivity matrix or image of the inter-well plane via inversion with ray-tracing. Some fluids (such as brine) in a hydrocarbon reservoir may be electrically conductive and may attenuate EM signals. The presence of such fluids presents significant challenges to continuous-wave EM surveying, as such surveying must be performed at very low frequencies (for example, about 1 Hz to about 10 kHz) which severely limits cross-well imaging resolution. Moreover, presence, concentration and distribution of EM-attenuating fluids in a reservoir are generally unknown prior to investigation, further increasing the difficulties of determining the optimal frequency for EM surveying and the corresponding imaging accuracy.

SUMMARY

Embodiments of the disclosure generally relate to EM surveying (also referred to as "EM imaging" or "EM interrogation") of subsurface hydrocarbon reservoirs using an injection fluid having a giant dielectric material.

The use of the giant dielectric material as a contrast agent may improve the contrast between the injection fluid and water saturated reservoir rock or connate water. Further, the giant dielectric material contrast agent may enable the use of a broader frequency range for EM surveying of subsurface hydrocarbon reservoirs. Additionally, in some embodiments, the giant dielectric material contrast agent may no longer require the use of pulsed EM transmissions in EM surveying, thus allowing commercially manufactured antennas to be used, therefore reducing the difficulty and cost of EM surveying operations.

In one embodiment, a method of electromagnetic imaging of a subsurface hydrocarbon reservoir is provided. The method includes introducing an injection fluid into the subsurface hydrocarbon reservoir. The injection fluid includes a contrast agent having a plurality of giant dielectric nanoparticles, such that the plurality of giant dielectric nanoparticles have a dielectric constant of at least 10000 at a frequency in the range of 1 hertz (Hz) to 1 megahertz (Mhz). The method further includes emitting pulses of electromagnetic energy from a subsurface borehole to travel through the subsurface hydrocarbon reservoir and determining the transit time of the emitted pulses of electromagnetic energy from a plurality of electromagnetic sensors, such that the transit time of the emitted pulses through the injection fluid is greater than the transit time of the emitted pulses through the subsurface hydrocarbon reservoir absent the injection fluid. The method further includes generating an image of the position of the injection fluid through the subsurface hydrocarbon reservoir based on the determined transit time. In some embodiments, the plurality of giant dielectric nanoparticles include nanoparticles of A-Cu3Ti4O12, such that A is selected from the group consisting of Ce, Eu, Gd, Tb, Yb, and Bi. In some embodiments, the plurality of giant dielectric nanoparticles include nanoparticles of at least one of copper titanate (CCTO), a doped nickel oxide having a dopant selected from the group consisting of Li, Ti, Fe, and V, a doped cupric oxide having a dopant selecting from the group Ta, Ca, and Ba, barium titanate, and bismuth strontium titanate. In some embodiments, the plurality of giant dielectric nanoparticles comprise an amount in the range of 1 weight % of the total weight (w/w %) to 10 w/w %. In some embodiments, the injection fluid comprises an aqueous fluid. In some embodiments, emitting pulses of electromagnetic energy from a subsurface borehole to travel through the subsurface hydrocarbon reservoir comprises emitting of electromagnetic energy from at least one transmitter positioned in the subsurface borehole. In some embodiments, the subsurface borehole comprises a first subsurface borehole, wherein the plurality of electromagnetic sensors are positioned in a second subsurface borehole. In some embodiments, the plurality of electromagnetic sensors are positioned on the surface. In some embodiments, the image comprises a 2-D spatial map. In some embodiments, generating an image of the position of the injection fluid through the subsurface hydrocarbon reservoir based on the determined transit time comprises performing an inversion of the determined transit time. In some embodiments, the method includes forming the injection fluid by mixing an aqueous fluid with the plurality of giant dielectric nanoparticles. In some embodiments, the method includes identifying a subsurface feature in the subsurface hydrocarbon reservoir based on the image.

In another embodiment, an injection fluid composition for the imaging of a subsurface hydrocarbon reservoir is provided. The injection fluid composition includes an aqueous fluid and a contrast agent having a plurality of giant dielectric nanoparticles, such that the plurality of giant dielectric nanoparticles have a dielectric constant of at least 10000 at a frequency in the range of 1 hertz (Hz) to 1 megahertz (Mhz). In some embodiments, the plurality of giant dielectric nanoparticles comprise nanoparticles of A-Cu3Ti4O12, such that A is selected from the group consisting of Ce, Eu, Gd, Tb, Yb, and Bi. In some embodiments, the plurality of giant dielectric nanoparticles comprise nanoparticles of at least one of copper titanate (CCTO), a doped nickel oxide having a dopant selected from the group consisting of Li, Ti, Fe, and V, a doped cupric oxide having a dopant selecting from the group Ta, Ca, and Ba, barium titanate, and bismuth strontium titanate. In some embodiments, the plurality of giant dielectric nanoparticles comprise an amount in the range of 1 weight % of the total weight (w/w %) to 10 w/w %. In some embodiments, the aqueous fluid comprises fresh water or seawater.

DETAILED DESCRIPTION

The present disclosure will be described more fully with reference to the accompanying drawings, which illustrate embodiments of the disclosure. This disclosure may, however, be embodied in many different forms and should not be construed as limited to the illustrated embodiments. Rather, these embodiments are provided so that this disclosure will be thorough and complete, and will fully convey the scope of the disclosure to those skilled in the art.

As will be appreciated, electromagnetic (EM) surveying (also referred to as "EM imaging" or "EM interrogation") of a reservoir relies on the difference between the velocity of an EM wave though a contrast agent as compared to the velocity of the EM wave through a surrounding environment (for example, water saturated reservoir rock). The velocity of an EM wave may be determined according to Equation 1:

$$V = \frac{c}{\sqrt{\varepsilon_r \mu_r}} \quad (1)$$

Where V is the wave velocity, c is the speed of light in a vacuum, $\varepsilon_r$ is the dielectric constant, and $\mu_r$ is the relative magnetic permeability. For example, inside a produced reservoir, the EM velocity is determined by the $\varepsilon_r$ and $\mu_r$ of the water and reservoir rock and is dependent on the amount of water saturation. In one example, an average values for water saturated sand with a 20% porosity may be $\varepsilon_r$=3.5 and $\mu_r$=1. Thus, the velocity of the EM wave through a water saturated reservoir may be slowed by $\sqrt{3.5}$.

Accordingly, if an injected water moving through a reservoir during a waterflooding operation has an EM velocity greater than the water saturating the reservoir rock, the injected water may be tracked as transmitted and received EM waves travel slower through the injected water than through the static water already saturating the reservoir rock. As discussed in the disclosure, this time delay may be measured directly by cross-well (also referred to as borehole-to-borehole) or borehole-to-surface measurements. Larger time delays between an EM transmitter and receiver implies a slower EM velocity as compared to the EM velocity through existing reservoir rock and static water saturating the rock. In this manner, the injected water may be tracked by its contrast in EM wave velocity as it travels through the reservoir.

Embodiments of the disclosure include injection fluid compositions for EM surveying that include giant dielectric materials. In some embodiments, an injection fluid may include an aqueous fluid and giant dielectric nanoparticles. As used in the disclosure, the term "giant dielectric" refers to materials having a dielectric constant of at least 10000 (for example, in the range of 10000 to 1000000) in the 1 hertz (Hz) to 1 megahertz (Mhz) frequency range. In some embodiments, the giant dielectric nanoparticles may include nanoparticles of A-Cu3Ti4O12 (where "A" includes a trivalent rare earth element, such as Ce, Eu, Gd, Tb, Yb, or may include Bi) compounds such as calcium copper titanate (CCTO), nanoparticles of doped nickel oxides (for example, nickel oxides doped with Li, Ti, Fe, or V), nanoparticles of doped cupric oxides (for example, cupric oxides doped with Ta, Ca, or Ba), nanoparticles of barium titanate, and nanoparticles of bismuth strontium titanate. In some embodiments, the giant dielectric materials may include polymer-based carbon nanotube composites. In some embodiments, an injection fluid for use in EM surveying may include the giant dielectric materials described in the disclosure in an amount of at least 1 weight % of the total weight (w/w %).

Embodiments of the disclosure further include EM surveying of a hydrocarbon reservoir using an injection fluid having giant dielectric nanoparticles as a contrast agent. The injection fluid may be introduced into the reservoir, such as via a borehole of an injection well. In some embodiments, one or more transmitter and one or more receivers may be positioned to measure directly by cross-well (also referred to as borehole-to-borehole) or borehole-to-surface arrangements. EM energy that travels through the reservoir may be emitted from the one or more transmitters and detected by the one or more receivers. The transit time of the EM energy is a function of the EM velocity and is thus greater for EM energy traveling through the injection fluid with the high contrast agent. The transit time of the EM energy may be determined and used to generate an image of the position of the injection fluid and, in some embodiments, identify subsurface features present in a reservoir.

Figure 1:
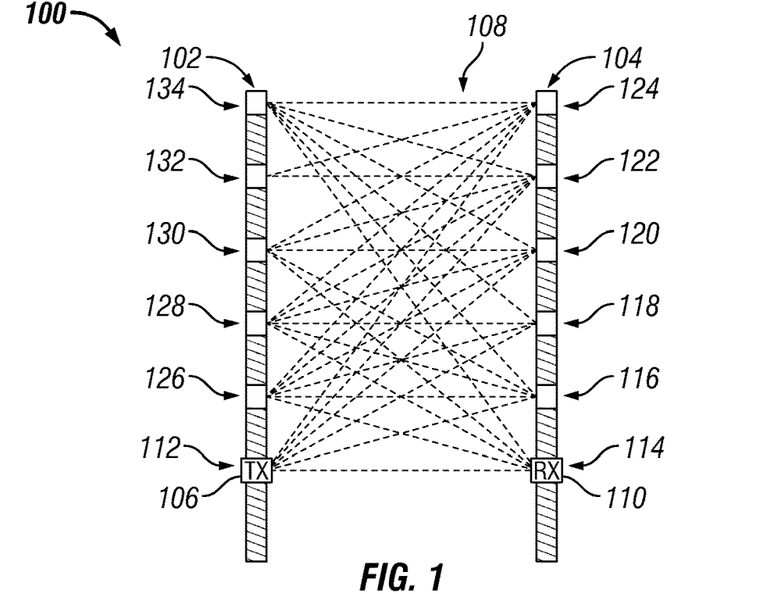
FIG. 1 is a schematic diagram of a transmitter-receiver array for a borehole-to-borehole electromagnetic survey in accordance with an embodiment of the disclosure.

FIG. 1 is a schematic diagram 100 of a transmitter-receiver arrangement for a borehole-to-borehole EM survey in accordance with an embodiment of the disclosure. As will be described infra, a number of EM energy measurements are performed with different combinations of transmitter and receiver locations in order to sample various parts of the reservoir from different directions, as shown in FIG. 1. The example shown in FIG. 1 depicts a transmit borehole 102 and a receiver borehole 104. In some embodiments, the transmit borehole 102 may be borehole of an injection well and the receiver borehole 104 may be a borehole of a producing well. In other embodiments, the transmit borehole 102 may be borehole of a producing well and the receiver borehole 104 may be a borehole of an injection well.

As shown in FIG. 1, one or more transmitters 106 may be positioned in the transmit borehole 102 to emit EM energy (represented by lines 108) to travel through subsurface earth formations. The one or more transmitters 106 may include EM sources known in the art that include time-varying capability. For example, the one or more transmitters 106 may include loop antennas. In some embodiments, the current profile used to drive the antenna may be generated by a pulse forming circuit Blumlein circuit or a type known as a thyristor circuit.

The emitted EM energy may be, after transiting the subsurface earth formations, received by one or more receivers 110 (for example, EM sensors) positioned in the receiver borehole 104. The one or more receivers 110 may include EM sensors capable of detecting the EM energy at the strengths and frequencies emitted by the one or more transmitters 106. For example, the one or more receivers 110 may include loop antennas coupled to a recording instrument or an oscilloscope component.

In some embodiments, for example, a single transmitter (TX) 106 may be positioned in the transmit borehole 102, and a single receiver (RX) 110 may be placed in the receiver borehole 104. The single transmitter 106 may remain in one position (for example, position 112) while EM transit data is collected from the six positions (for example, positions 114, 116, 118, 120, 122, 124) shown in the receiver borehole 104. After collection of the data, the single transmitter 106 may be moved to the second position (for example, position 126) shown in the transmit borehole 102 and remain in this position while EM transit data is collected from the six positions (for example, positions 114, 116, 118, 120, 122, and 124) shown in the receiver borehole 104. The transmitter may subsequently be moved to third, fourth, fifth and sixth positions (for example, positions 128, 130, 132, and 134) while EM transit data is collected from the six positions (for example, positions 114, 116, 118, 120, and 122) at shown in the receiver borehole 104. In such an example embodiment, a total of 36 data sets may be collected for the combinations of transmitter and receiver.

In some embodiments, the one or more transmitters 106 and the one or more receivers 110 may each be mounted on or a part of a wireline tool suspending on a wireline from a surface above the boreholes 102 and 104. The wireline may be raised and lowered within the boreholes 102 or 104 to various depths using devices known in the art, such as a reel and drum apparatus in a service truck having the various components of a wireline system. The wireline may include a conductor and may enable transmission of signals between the one or more transmitters 106 and the surface, and between the one or more receivers 110 and surface. For example, signals may be sent from the surface (for example, from a surface computer) to the one or more transmitters 106 in the transmit borehole 102 to control emission of EM energy. Similarly, signals may be received from the one or more receivers 110 at the surface (for example, by a surface computer) to acquire measurement data associated with received EM energy.

Figure 2:
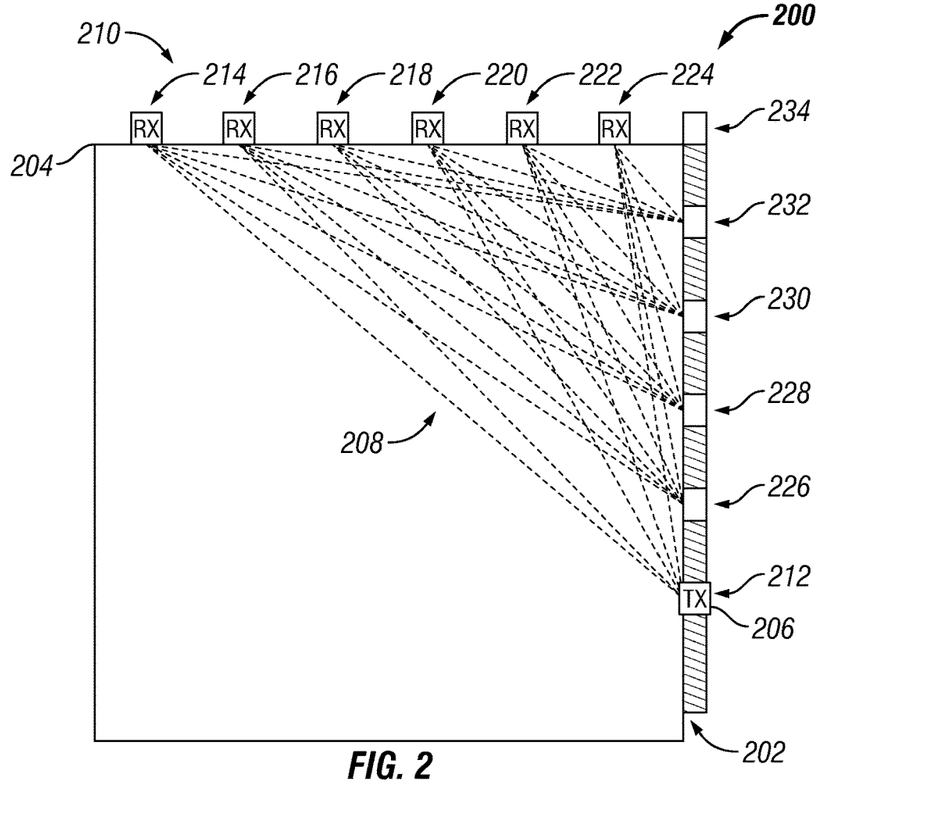
FIG. 2 is a schematic diagram of a transmitter-receiver array for a borehole-to-surface electromagnetic survey in accordance with an embodiment of the disclosure.

FIG. 2 is a schematic diagram 200 of a transmitter-receiver array for a borehole-to-surface EM survey in accordance with an embodiment of the disclosure. Here again, a number of EM energy measurements are performed with different combinations of transmitter and receiver locations in order to sample various parts of the reservoir from different directions, as shown in FIG. The example shown in FIG. 2 depicts a transmit borehole 202 (such as a borehole of a producer well or an injection well) and a surface 204 at which transmitted EM energy is received.

As shown in FIG. 2, one or more transmitters 206 may be positioned in the transmit borehole 202 to emit EM energy (represented by lines 208) to travel through subsurface earth formations. The one or more transmitters 206 may include EM sources known in the art that include time-varying capability. For example, the one or more transmitters 206 may include dipole antennas. In some embodiments, the current profile used to drive the antenna may be generated by a pulse forming circuit Blumlein circuit or a type known as a thyristor circuit.

The emitted EM energy may be received by one or more receivers (for example, receiver array 210) positioned at the surface 206. The one or more receivers of the receiver array 210 may include EM sensors capable of detecting the EM energy at the strengths and frequencies emitted by the one or more transmitters 206. For example, the one or more receivers may include dipole antennas coupled to a recording instrument or an oscilloscope component.

In some embodiments, for example, a single transmitter 206 may be positioned in the transmit borehole 202. The single transmitter may remain in one position (for example, position 212) while EM transit data is collected from the six positions (for example, positions 214, 216, 218, 220, 222, and 224) provided by the receiver array 210 at the surface 204. After collection of the data, the single transmitter 206 may be moved to the second position (for example, position 226) shown in the transmit borehole 202 and remain in this position while EM transit data is collected from the six positions (for example, positions 214, 216, 218, 220, and 222) provided by the receiver array 210 at the surface 204. The transmitter may subsequently be moved to third, fourth, fifth and sixth positions (for example, positions 226, 228, 230, 232, and 234) while EM transit data is collected from the six positions (for example, positions 214, 216, 218, 220, 222, and 224) provided by the receiver array 210 at the surface 204. In such an example embodiment, a total of 36 data sets may be collected for the combinations of transmitter and receiver.

Similar to the embodiment described supra and illustrated in FIG. 1, the one or more transmitters 206 may be mounted on or a part of a wireline tool suspended on a wireline from a surface above the borehole 202. Signals may be received (for example, by a surface computer) from the one or more receivers 210 located at the surface to acquire measurement data associated with received EM energy.

As will be appreciated, multiple measurements of transmissions such as those shown in FIGS. 1 and 2 may be summed or averaged at a transmitter and receiver pair to improve signal to noise ratios. Multiple transmitters (for example, an array) may be employed, as well as multiple receivers (for example, an array). Transmitters and receivers, either individual or arrays thereof, may be placed at multiple locations to survey different areas of the reservoir or survey each area from different directions.

Figure 3:
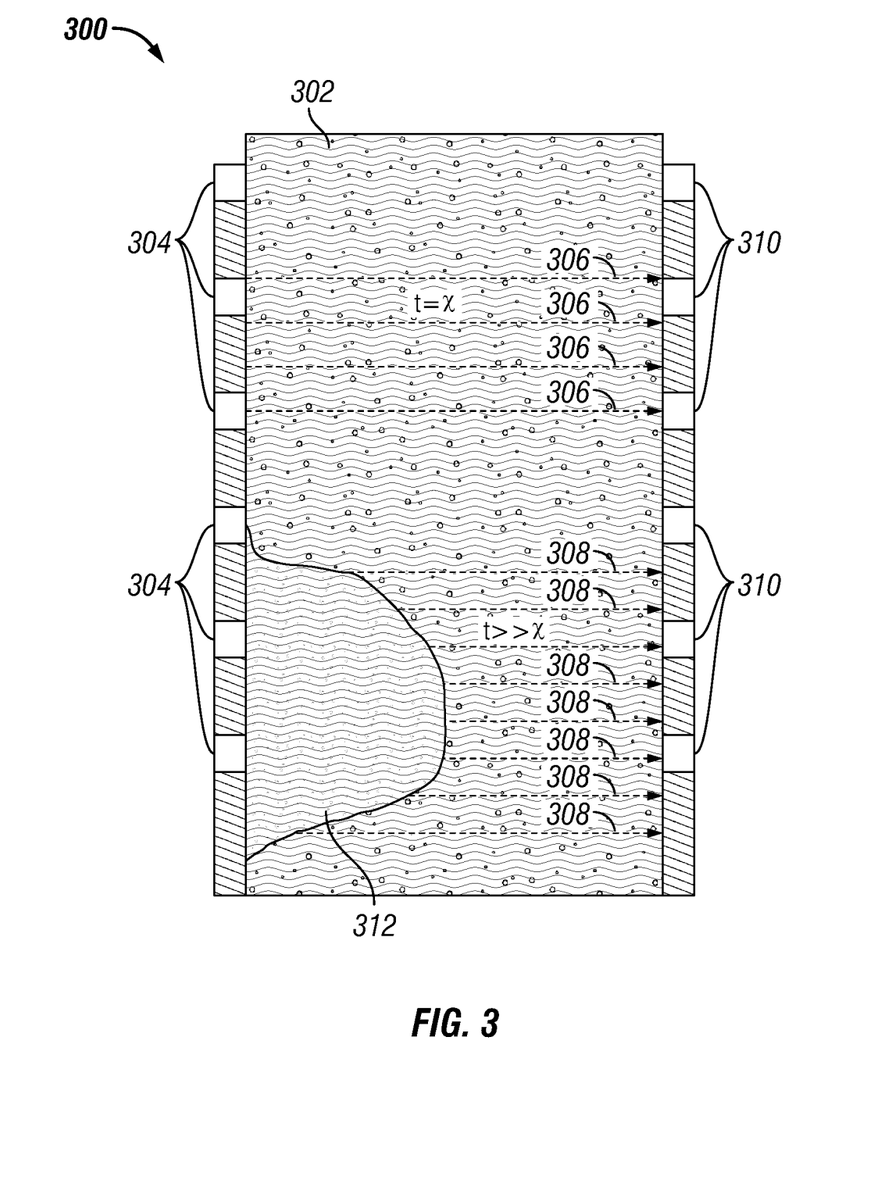
FIG. 3 is a schematic diagram illustrating the time delay of EM signals resulting from a contrast agent having a dielectric constant greater than saturated reservoir rock in accordance with an embodiment of the disclosure.

FIG. 3 is a schematic diagram 300 illustrating the time delay of EM signals resulting from a contrast agent having a dielectric constant greater than saturated reservoir rock 302 in accordance with an embodiment of the disclosure. Similar to the embodiments shown in FIG. 1 and discussed supra, FIG. 3 depicts one or more transmitters 304, such as positioned in a transmit borehole, that emit EM energy (represented by lines 306 and 308) that transits through the water saturated reservoir rock 302 and is received by one or more receivers 310 positioned in a receiver borehole.

As shown in FIG. 3, the EM energy 306 that transits through the water saturated reservoir rock 302 may transit through the water saturated reservoir rock 302 at a time (t) of x (t=x). FIG. 3 also depicts a portion of the water saturated reservoir rock 302 injected with an injection fluid having a contrast agent (depicted by region 312). As opposed to the EM energy 306, the EM energy 308 that travels through the injection fluid having the contrast agent 312 in addition to portions of the water saturated reservoir rock 302 has a total transit time of significantly greater than x (t>>x). Thus, as described in the disclosure, the use of a contrast agent may increase the contrast between the injection fluid and water saturated reservoir rock.

As described in the disclosure, the contrast agent used in the injection fluid in EM surveying may have a dielectric constant (also referred to as relative electric permittivity $\varepsilon_r$) greater than water saturated reservoir rock to improve the resolution of the contrast agent from the reservoir. A typical water saturated reservoir rock may have a dielectric constant of about 3.5. Conventional high dielectric materials may have a dielectric constant in the range of about 3.5 to about 100 and may not exhibit a significant enough contrast with the water saturated reservoir rock, especially when such high electric materials are in solution (that is, in the injection fluid).

Accordingly, embodiments of the disclosure include conducting EM surveying using "giant" dielectric materials. As used in the disclosure, the term giant dielectric refers to materials having a dielectric constant of at least 10000 in the 1 Hz to 1 MHz frequency range. By way of example, such giant dielectric materials may include calcium copper titanate (CCTO) and other A-Cu3Ti4O12 compounds (where "A" includes a trivalent rare earth element, such as Ce, Eu, Gd, Tb, Yb, or may include Bi), doped nickel oxides (for example, nickel oxides doped with Li, Ti, Fe, or V), doped cupric oxides (for example, cupric oxides doped with Ta, Ca, or Ba), barium titanate, and bismuth strontium titanate.

In some embodiments, an injection fluid may include an aqueous fluid and a contrast agent having giant dielectric nanoparticles. In some embodiments, the aqueous fluid may be fresh water (water having relatively low (that is, less than 5000 parts-per-million by mass (ppm)) concentrations of total dissolved solids (TDS)) or seawater (for example, water having a salinity in the range of about 30,000 to about 40,000 ppm TDS). In some embodiments, the aqueous fluid may include artificial brines, natural brines, brackish water, or formation water. In some embodiments, the giant dielectric nanoparticles may be present in an amount in the range of about 1 w/w % to about 10 w/w %. In some embodiments, the amount of giant dielectric nanoparticles may be selected based on the pH of the injection fluid and the type of nanoparticle. Advantageously, the injection fluid having the giant dielectric nanoparticles may provide a significantly greater contrast to water saturated rock or connate water as compared to existing injection fluids.

Figure 4:
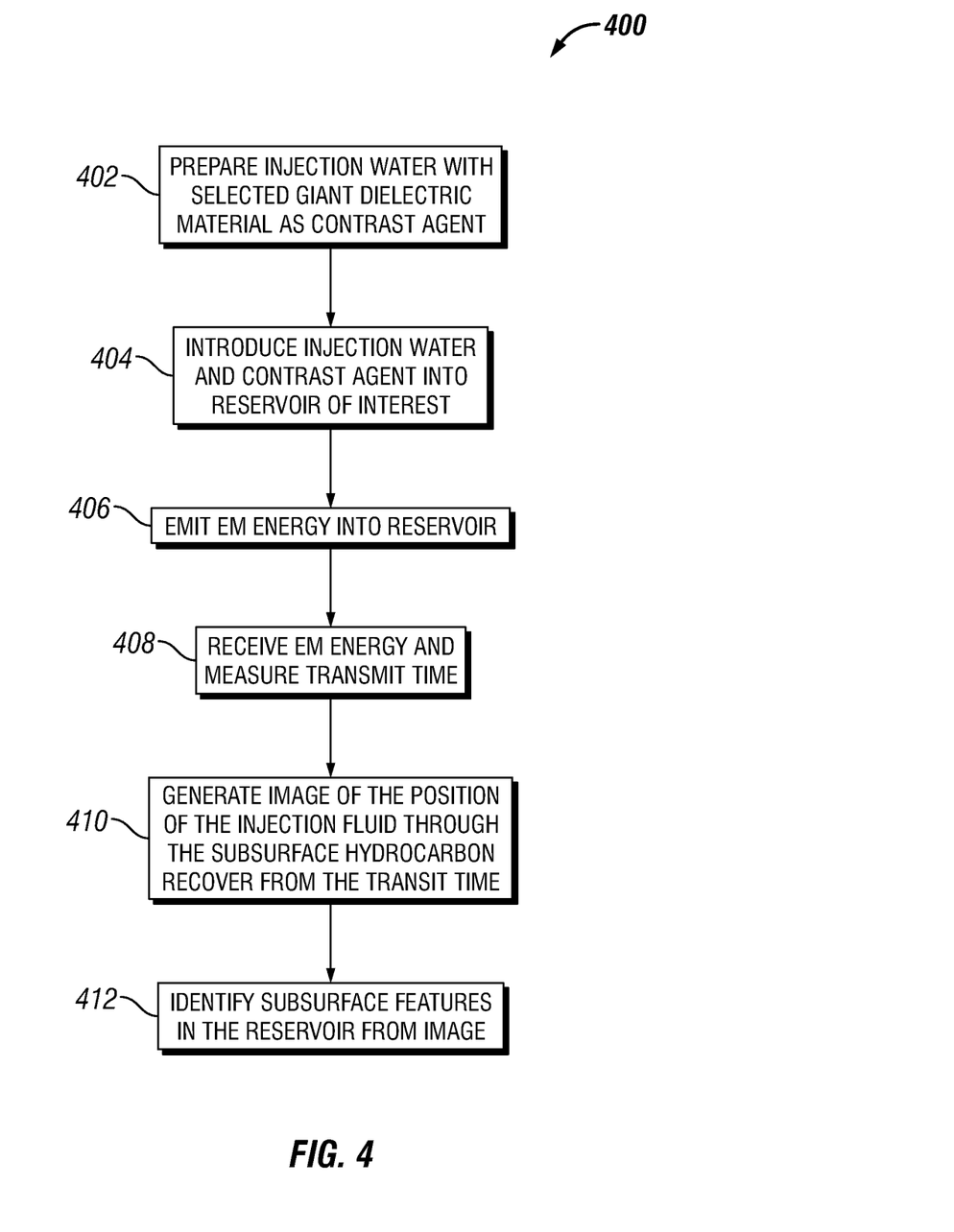
FIG. 4 is a flowchart of a process for imaging a reservoir using giant dielectric nanoparticles in accordance with an embodiment of the disclosure.

FIG. 4 depicts a process 400 for imaging a reservoir using giant dielectric nanoparticles in accordance with an embodiment of the disclosure. Initially, an injection fluid may be prepared from an aqueous fluid and a selected giant dielectric material as a contrast agent (block 402). As discussed in the disclosure, suitable giant dielectric materials may include nanoparticles of the following materials; calcium copper titanate (CCTO) and other A-Cu3Ti4O12 compounds (where "A" includes a trivalent rare earth element, such as Ce, Eu, Gd, Tb, Yb, or may include Bi), doped nickel oxides (for example, nickel oxides doped with Li, Ti, Fe, or V), doped cupric oxides (for example, cupric oxides doped with Ta, Ca, or Ba), barium titanate, or bismuth strontium titanate. In some embodiments, the giant dielectric nanoparticles may be in an amount in the range of about 1 w/w % to about 10 w/w %. The giant dielectric nanoparticles may be mixed with the aqueous fluid using known mixing techniques to prepare the injection fluid at the surface.

The injection fluid having the contrast agent may be introduced into a reservoir of interest (block 404) using techniques known in the art. For example, in some embodiments, the injection fluid may be pumped into an injection well in fluid connection with a producing well, such as in a waterflooding operation.

Next, EM energy may be emitted into the reservoir (block 406), such as via EM energy pulses from one or more transmitters. For example, one or more transmitters may be positioned in a transmit borehole to emit EM energy into a reservoir. In some embodiments, the transmit borehole may be a borehole of an injection well (for example, the injection well used to introduce the injection fluid) or a producing well. In some embodiments, the one or transmitters may be a transmitter array. In some embodiments, the one or more transmitters may be a single transmitter that is repositioned at different positions in the transmit borehole for the emission of EM energy. The EM energy pulses may be emitted at frequencies selected based on the size of the area being surveyed.

The EM energy pulses may be received at one or more receivers, and the transit time of the emitted EM pulses may be measured (block 408). For example, as discussed in the disclosure, in some embodiments one or more receivers may be positioned in a receiver borehole (for example, a borehole of an injection well or a producing well) to provide for cross-well (borehole-to-borehole) measurements. In other embodiments, one or more receivers, such as a receiver array, may be positioned at a surface above the transmit borehole, to provide for borehole-to-surface measurements. In some embodiments, both cross-well and surface-to-borehole techniques may be used to analyze a reservoir of interest. In some embodiments, other characteristics of the received EM energy pulses may be determined. For example, in some embodiments the signal strength (for example, amplitude or power) as a function of frequency of the EM energy pulses may be determined.

An image of the position of the injection fluid through the subsurface hydrocarbon recover may be generated from the transit time (block 410). For example, the transit time may be used to generate a two-dimensional (2-D) spatial map of the position of the injection fluid at any time during a waterflooding operation. The image may be generated by performing an inversion of the transit time data using inversion techniques known in the art. In some embodiments, as known in the art, other characteristics of the EM energy pulses, such as signal strength as a function of a frequency, may be used during the inversion to improve the generated image.

The image may enable an identification of the subsurface features in the reservoir, such as by further analysis of the transit time (block 412). In some embodiments, paths in the reservoir that are permeable to the injection fluid may be identified. Additionally, the use an injection fluid having a contrast agent as described in the disclosure may enable the injection fluid to be distinguished from a different previously injected injection fluid or other fluids present in the reservoir.

Ranges may be expressed in the disclosure as from about one particular value, to about another particular value, or both. When such a range is expressed, it is to be understood that another embodiment is from the one particular value, to the other particular value, or both, along with all combinations within said range.

Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the embodiments described in the disclosure. It is to be understood that the forms shown and described in the disclosure are to be taken as examples of embodiments. Elements and materials may be substituted for those illustrated and described in the disclosure, parts and processes may be reversed or omitted, and certain features may be utilized independently, all as would be apparent to one skilled in the art after having the benefit of this description. Changes may be made in the elements described in the disclosure without departing from the spirit and scope of the disclosure as described in the following claims. Headings used described in the disclosure are for organizational purposes only and are not meant to be used to limit the scope of the description.

What is claimed is:

1. An injection fluid composition for the imaging of a subsurface hydrocarbon reservoir, comprising:
   an aqueous fluid; and
   a contrast agent comprising a plurality of giant dielectric nanoparticles, wherein the plurality of giant dielectric nanoparticles have a dielectric constant of at least 10000 at a frequency in the range of 1 hertz (Hz) to 1 megahertz (Mhz), wherein the plurality of giant dielectric nanoparticles comprise an amount in a range of 1 weight % of the total weight (w/w %) to 10 w/w %;
   wherein the injection fluid composition having the aqueous fluid and the contrast agent is introduced in the subsurface hydrocarbon reservoir to generate an image of a position of the injection fluid composition through the subsurface hydrocarbon reservoir.

2. The composition of claim 1, wherein the plurality of giant dielectric nanoparticles comprise nanoparticles of A-Cu3Ti4O12, wherein A is selected from the group consisting of Ce, Eu, Gd, Tb, Yb, and Bi.

3. The composition of claim 1, wherein the aqueous fluid comprises fresh water or seawater.

4. An injection fluid composition for imaging of a subsurface hydrocarbon reservoir, comprising:
   an aqueous fluid; and
   a contrast agent comprising a plurality of giant dielectric nanoparticles, wherein the plurality of giant dielectric nanoparticles have a dielectric constant of at least 10000 at a frequency in the range of 1 hertz (Hz) to 1 megahertz (Mhz), wherein the plurality of giant dielectric nanoparticles comprise a doped nickel oxide having a dopant selected from the group consisting of Li, Ti, Fe, and V or a doped cupric oxide having a dopant selecting from the group Ta, Ca, and Ba, barium titanate, and bismuth strontium titanate;
   wherein the injection fluid composition having the aqueous fluid and the contrast agent is introduced in the subsurface hydrocarbon reservoir to generate an image of a position of the injection fluid composition through the subsurface hydrocarbon reservoir.

5. The composition of 6, wherein the plurality of giant dielectric nanoparticles comprise an amount in a range of 1 weight % of the total weight (w/w %) to 10 w/w %.

6. The composition of claim 4, wherein the aqueous fluid comprises fresh water or seawater.

* * * * *

UNITED STATES PATENT AND TRADEMARK OFFICE
CERTIFICATE OF CORRECTION

PATENT NO. : 10,690,798 B2
APPLICATION NO. : 16/388170
DATED : June 23, 2020
INVENTOR(S) : Shoemaker Ellis et al.

Page 1 of 1

It is certified that error appears in the above-identified patent and that said Letters Patent is hereby corrected as shown below:

In the Claims

In Column 9, Claim 1, Line 16 should read:
-- 1. An injection fluid composition for imaging of a --

Signed and Sealed this
Eighteenth Day of August, 2020

Andrei Iancu
*Director of the United States Patent and Trademark Office*